US007356529B1

(12) United States Patent
Ennis et al.

(10) Patent No.: US 7,356,529 B1
(45) Date of Patent: Apr. 8, 2008

(54) MECHANISM FOR FACILITATING SUBSCRIPTION IN A PUBLISH/SUBSCRIBE COMMUNICATION SYSTEM

(75) Inventors: Damon John Ennis, Los Gatos, CA (US); Mark Allen Dowdy, Los Altos, CA (US); Todd Miles Hoff, Los Gatos, CA (US); Keith Erhart Rasmussen, Los Gatos, CA (US)

(73) Assignee: Ciena Corporation, Linthicum, MD (US)

( * ) Notice: Subject to any disclaimer, the term of this patent is extended or adjusted under 35 U.S.C. 154(b) by 515 days.

(21) Appl. No.: 10/003,186

(22) Filed: Oct. 29, 2001

Related U.S. Application Data

(60) Provisional application No. 60/308,476, filed on Jul. 27, 2001.

(51) Int. Cl.
  *G06F 17/30* (2006.01)
(52) U.S. Cl. .............................. 707/6; 707/9; 707/100; 707/101; 709/206
(58) Field of Classification Search ................ 707/6, 707/9, 100, 101; 709/206; 719/318
See application file for complete search history.

(56) References Cited

U.S. PATENT DOCUMENTS

| | | | | |
|---|---|---|---|---|
| 5,974,417 A | * | 10/1999 | Bracho et al. ................ | 707/10 |
| 6,138,049 A | * | 10/2000 | McLaughlin ................ | 700/67 |
| 6,202,093 B1 | * | 3/2001 | Bolam et al. ................ | 709/225 |
| 6,275,957 B1 | * | 8/2001 | Novik et al. .................. | 714/39 |
| 6,298,455 B1 | * | 10/2001 | Knapman et al. ............. | 714/43 |
| 6,336,119 B1 | * | 1/2002 | Banavar et al. .......... | 707/104.1 |
| 6,366,926 B1 | * | 4/2002 | Pohlmann et al. ....... | 707/104.1 |
| 6,446,136 B1 | * | 9/2002 | Pohlmann et al. .......... | 719/318 |
| 2002/0016867 A1 | * | 2/2002 | Kampe et al. ............. | 709/318 |
| 2002/0170035 A1 | * | 11/2002 | Casati et al. ................ | 717/127 |
| 2002/0194347 A1 | * | 12/2002 | Koo et al. .................. | 709/227 |

OTHER PUBLICATIONS

Kaiser J., "Implementing the Real-Time Publisher/Subscriber Model on the Controller Area Network (CAN)", 2nd Int'l Symposium on ObjectOriented Distributed Real-Time Computing Systems, San Malo, May 1999.*

* cited by examiner

*Primary Examiner*—Khanh B. Pham
(74) *Attorney, Agent, or Firm*—Merek, Blackmon & Voorhees, LLC

(57) ABSTRACT

An improved inter-module communication facilitation mechanism (CFM) is disclosed, which provides improved scalability, improved efficiency, and enhanced functionality and performance. In one aspect, the CFM enables a subscriber to subscribe to multiple events using a single namespace specification and a single subscription request. In another aspect, the CFM enables publishers to broadcast, rather than unicast, events to multiple subscribers concurrently. In yet another aspect, the CFM enables message exchange between senders and recipients to be conducted reliably, while at the same time ensuring that a message will be delivered to a recipient at most once. These and other aspects give rise to the many benefits offered by the CFM.

22 Claims, 10 Drawing Sheets

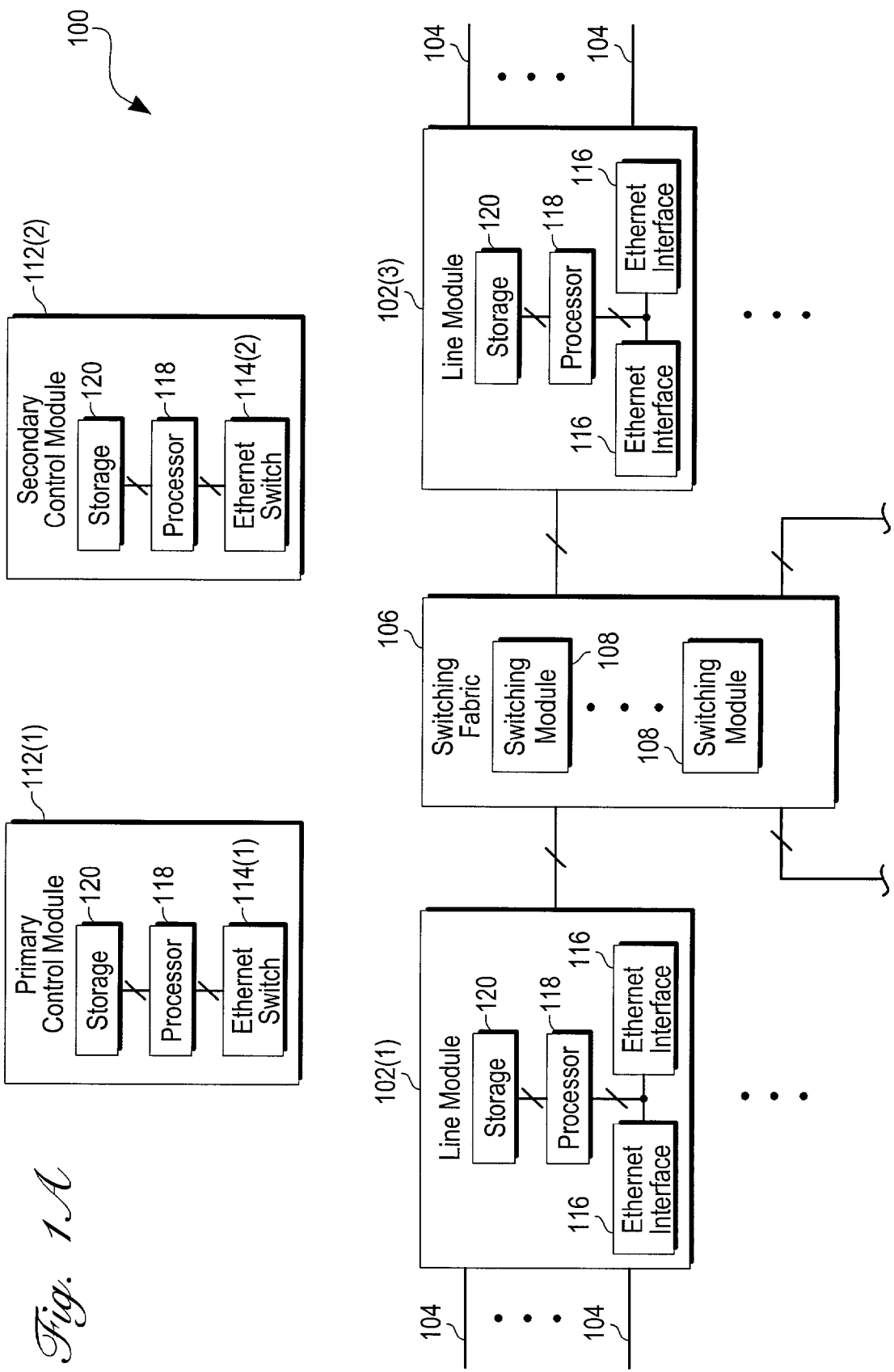

Local Publishers Table — 302

| Namespace | Reference to Publisher | IP address/ Port # |
|---|---|---|
| /LM/1/Monitor/Event/LOS | P1 | X1, Y1 |

Local Subscribers Table — 304

| Namespace | Reference to Subscriber | IP address/ Port # | Reliability | Priority |
|---|---|---|---|---|
| /LM/2/Foo/Event/Sleep | S1 | X1, Y1 | Reliable | Normal |
| /LM/1/Monitor/Event/LOS | S2 | X2, Y2 | Best Effort | Normal |

Local Servers Table

| Namespace | Reference to Server | IP address/ Port # | Reliability | Priority |
|---|---|---|---|---|
| /LM/1/Monitor/Op/Get | P1 | X1, Y1 | Best Effort | Normal |
| /LM/2/Foo/Op/Set | P2 | X2, Y2 | Best Effort | Normal |

Fig. 3C

Local Clients Table

| Namespace | Reference to Client | IP address/ Port # |
|---|---|---|
| /LM/2/Foo/Op/Set | S1 | X1, Y1 |

Fig. 3D

Local Servers Table

| Namespace | Reference to Server | IP address/Port # | Reliability | Priority |
|---|---|---|---|---|
| /LM/2/Foo/Op/Set | P2 | X2, Y2 | Best Effort | Normal |
| /LM/1/Monitor/Op/Get | P1 | X1, Y1 | Best Effort | Normal |

*Fig. 4C*

Local Clients Table

| Namespace | Reference to Client | IP address/Port # |
|---|---|---|
| /LM/1/Monitor/Op/Get | S2 | X2, Y2 |

*Fig. 4D*

Global Publishers Table 502

| Namespace | Reference to Publisher | IP address/Port # |
|---|---|---|
| /LM/1/Monitor/Event/LOS | P1 | X1, Y1 |
| /LM/2/Foo/Event/Sleep | P2 | X2, Y2 |
| /LM/3/Bar/Event/Wake | P3 | X3, Y3 |
| ... | | |

510 — /LM/1/Monitor/Event/LOS
512 — /LM/2/Foo/Event/Sleep
514 — /LM/3/Bar/Event/Wake

*Fig. 5A*

Global Subscribers Table 504

| Namespace | Reference to Subscriber | IP address/Port # | Reliability | Priority |
|---|---|---|---|---|
| /LM/2/Foo/Event/Sleep | S1 | X1, Y1 | Reliable | Normal |
| /*/Event/LOS | S2 | X2, Y2 | Best Effort | Normal |
| /LM/4/Test/Event/True | S3 | X4, Y4 | Best Effort | Normal |
| ... | | | ... | ... |

516 — /LM/2/Foo/Event/Sleep
518 — /*/Event/LOS
520 — /LM/4/Test/Event/True

*Fig. 5B*

Global Servers Table

| Namespace | Reference to Server | IP address/ Port # | Reliability | Priority |
|---|---|---|---|---|
| /LM/1/Monitor/Op/Get | P1 | X1, Y1 | Best Effort | Normal |
| /LM/2/Foo/Op/Set | P2 | X2, Y2 | Best Effort | Normal |
| . . . | . . . | . . . | . . . | . . . |

520 — /LM/1/Monitor/Op/Get
522 — /LM/2/Foo/Op/Set

Global Clients Table

| Namespace | Reference to Client | IP address/ Port # |
|---|---|---|
| /LM/2/Foo/Op/Set | S1 | X1, Y1 |
| /LM/1/Monitor/Op/Get | S2 | X2, Y2 |
| . . . | . . . | . . . |

524 — /LM/2/Foo/Op/Set
526 — /LM/1/Monitor/Op/Get

Reliable Communication Table 208(1)

| IP address/ Port # | Sending Sequence # | Receiving Sequence # | Missing Sequence Number List |
|---|---|---|---|
| X2, Y2 | 2040 | 50 | |
| ... | ... | ... | ... |

Reliable Communication Table 208(2)

| IP address/ Port # | Sending Sequence # | Receiving Sequence # | Missing Sequence Number List |
|---|---|---|---|
| X1, Y1 | 50 | 2040 | |
| ... | ... | ... | ... |

MECHANISM FOR FACILITATING SUBSCRIPTION IN A PUBLISH/SUBSCRIBE COMMUNICATION SYSTEM

CROSS-REFERENCE

This application claims the benefit of U.S. Provisional Application Ser. No. 60/308,476, entitled "Communication Facilitation Mechanism", filed Jul. 27, 2001, the entire contents of which are incorporated herein by this reference.

FIELD OF THE INVENTION

This invention relates generally to communication systems, and more particularly to a mechanism for facilitating subscription in a publish/subscribe communication system.

BACKGROUND

In the large-scale networks of today, switches are used on a regular basis to steer information from one location or site to another. In a typical switch, there are a plurality of line modules, control modules, timing modules, and switching modules. These various modules cooperate to carry out the switching and control functions of the switch. More specifically, the line modules carry information into and out of the switch, while the switching modules determine the interconnectivity between the line modules. By properly configuring the switching modules, any port of any line module may be coupled to any other port of any line module. Thus, the switching modules enable information to be switched or steered from any ingress line module port to any egress line module port.

The timing modules control the timing of the transfer of information from the ingress line module port to the egress line module port. Basically, the timing modules synchronize the ingress line module port and the egress line module port to ensure that information is transferred properly from one to the other. The control modules help to coordinate the interaction between the various other modules. While each module may implement its own control logic and may operate in many situations without the aid of the control modules, the control modules act as centralized mechanisms for coordinating the activities and communications between the various other modules.

In order to carry out all of the switching and control functions of the switch, the various modules need to communicate with each other. For example, the line modules may need to exchange information with one another to keep apprised of the overall state of the switch. Also, the line modules may need to communicate with the control modules to obtain coordination information therefrom. To enable the various modules to communicate with each other, a switch is typically provided with an underlying communication network. This network is separate and apart from the switching modules that interconnect the line modules. Also provided may be a communication facilitation mechanism. This mechanism shields the applications that may run on the various modules from the complexities of the communication network. By doing so, the facilitation mechanism makes it simpler for applications on the various modules to communicate with one another. Unfortunately, the communication facilitation mechanisms that are currently available for switches leave much to be desired. Many do not provide some highly desirable functionality, such as the ability to broadcast messages. In addition, many suffer from inefficiencies both in the publication and subscription process.

These and other shortcomings exist in the currently available mechanisms. In view of these shortcomings, there exists a need for an improved communication facilitation mechanism.

SUMMARY

In accordance with one embodiment of the present invention, there is provided an improved communication facilitation mechanism (CFM), which provides improved scalability, improved efficiency, and enhanced functionality and performance. In one aspect, the CFM enables a subscriber to subscribe to multiple events using a single namespace specification and a single subscription request. By providing this capability, the CFM eliminates the need for the subscriber to separately subscribe to each event. In systems in which many subscribers subscribe to many events, this capability can lead to significant improvement in efficiency and scalability.

In another aspect, the CFM enables publishers to broadcast, rather than unicast, events to multiple subscribers concurrently. This capability makes it possible for a publisher to notify all of the modules in a system of a particular event in a very short time. For events (such as failure notification) for which short response time is important, this capability can lead to greatly improved response time and performance.

In yet another aspect, the CFM enables message exchange between senders and recipients to be conducted reliably. In a typical reliable messaging system, the sender waits for an acknowledgment from the recipient. If an acknowledgment is not received, then the sender sends the message again. Because a message may be sent multiple times, a recipient may receive the same message multiple times, which in some implementations is highly undesirable. To prevent this, the CFM checks for duplicate messages when it is implementing reliable messaging. If the CFM determines that a message is a duplicate of one that has already been received, then it discards the message, thereby ensuring that the recipient does not receive duplicate messages. In this manner, the CFM implements reliable messaging with an "at most once" message delivery guarantee. These and other aspects are inherent in the CFM.

BRIEF DESCRIPTION OF THE DRAWINGS

FIGS. 1A-1B provide an overview of a system in which one embodiment of the present invention may be implemented.

FIGS. 3A-3D illustrate some sample local tables for the line module 102(1) shown in FIG. 2.

FIGS. 4A-4D illustrate some sample local tables for the line module 102(2) shown in FIG. 2.

FIGS. 5A-5D illustrate some sample global tables for the control module 212(1) shown in FIG. 2.

FIG. 6 illustrates a sample reliable communication table for the line module 102(1) shown in FIG. 2.

FIG. 7 illustrates a sample reliable communication table for the line module 102(2) shown in FIG. 2.

DETAILED DESCRIPTION OF EMBODIMENT(S)

System Overview

Figure 1B:
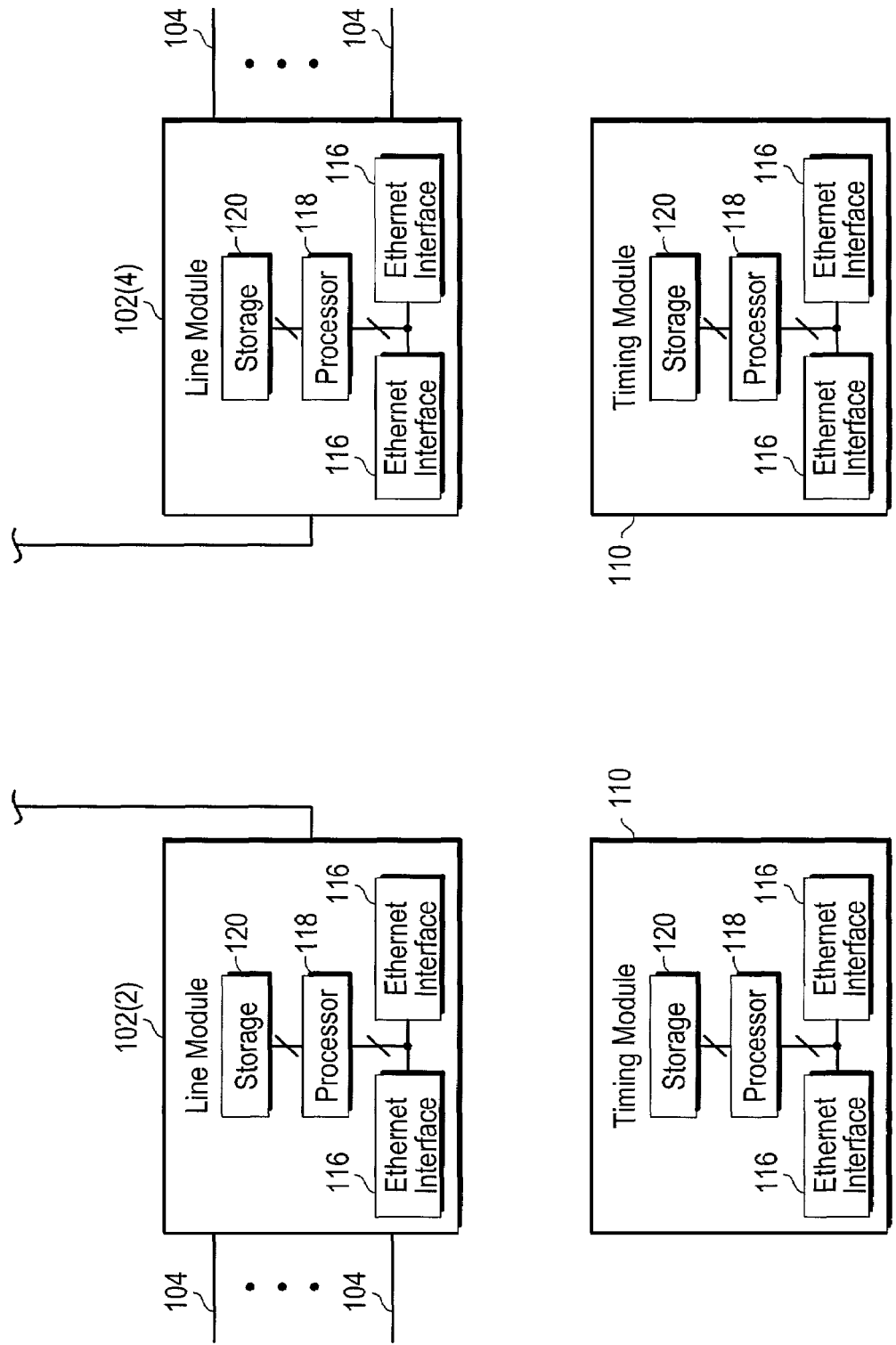

With reference to FIGS. 1A and 1B, there is shown an overview of a system 100 in which one embodiment of the present invention may be implemented. In the following discussion, it will be assumed for the sake of illustration that system 100 is a network switch for switching information from ingress ports to egress ports. It should be noted, however, that the present invention is not limited to being practiced within a switch, but rather may be implemented generally in any system in which inter-module distributed communication is desired.

As shown in FIGS. 1A and 1B, switch 100 comprises a plurality of line modules 102. In one embodiment, each line module 102 comprises a plurality of ports, with each port being coupled to a corresponding trunk 104. Each trunk 104, which may for example be an optical fiber, may carry information into a line module 102, out of a line module 102, or both. Each line module 102 is in turn coupled to a switching fabric 106, which comprises a plurality of switching components 108. When properly configured, the switching fabric 106 can couple any port of any line module 102 to any other port of any line module 102. Thus, by properly configuring the switching fabric 106, the switch 100 can transport information from any port of any line module 102 to any other port of any line module 102; hence, it follows that information can be switched from any trunk 104 to any other trunk 104. In this manner, information is transferred and directed through the switch 100.

The timing of information transfer through the switch 100 is controlled by the timing modules 110. More specifically, for each pair of line module ports that have been coupled together by the switching fabric 106, the timing modules 110 synchronize information transfer between the ports to ensure that information is transferred properly from one to the other.

In addition to the line modules 102, switching modules 106, and timing modules 110, the switch 100 further comprises a primary 112(1) and a secondary 112(2) control module. As will be explained in greater detail in a later section, the control modules 112 help to coordinate and facilitate interaction and communication between the various modules to enable all of the switching and control functions of the switch to be performed. In one embodiment, the primary control module 112(1) participates in regular system operation, while the secondary control module 112(2) acts as a backup. Should the primary control module 112(1) become disabled, then the secondary control module 112(2) will become the primary control module and will perform all of the functions of the primary control module.

To enable the various modules 102, 110, 112 to communicate with each other, switch 100 comprises an underlying communication network (not shown). In one embodiment, this communication network comprises an Ethernet backplane that interconnects all of the modules 102, 110, 112. In one embodiment, this network is separate and apart from the switching fabric 106 that couples the ports of the line modules 102 to each other. With the underlying communication network, any module 102, 110, 112 on the switch 100 can communicate with any other module on the switch 100. To enable the modules to access the communication network, there is provided on each line module 102 and each timing module 110 one or more Ethernet interfaces 116. Similarly, there is provided on each control module 112 an Ethernet switch 114. The Ethernet interfaces 116 are coupled to the Ethernet switches 114, and the Ethernet switches 114 are coupled to each other to provide each module 102, 110, 112 with connectivity and access to the communication network. In one embodiment, information is routed through the communication network using the Internet Protocol (IP). Thus, any module can send a message to any other module by specifying the IP address and port number associated with that other module.

As shown in FIGS. 1A and 1B, each line module 102, timing module 110, and control module 112 comprises a processor 118 and a storage 120. These components 118, 120 enable each module to implement its own set of logic and functionality. For example, each module may run its own set of one or more applications to implement any desired functionality. In addition, as will be described further in a later section, each module may execute one or more components of a communication facilitation mechanism (CFM) to facilitate inter-module communication. In one embodiment, the functionality of each module is derived by having the processor 118 on that module execute one or more sets of program instructions stored in the storage 120 of that module. In such an embodiment, the processor 118 (which may be a single processor or multiple processors) may be any mechanism capable of executing program instructions. The storage 120 may be any type of computer readable medium capable of storing information, including but not limited to memory, magnetic storage, and optical storage. The storage 120 may be used to store program instructions, data used by the processor 118 in executing the program instructions, data generated by the processor 118, as well as any other type of information.

In an alternative embodiment, the processor 118 may be replaced by specialized hardware logic components specially configured to implement some desired functionality. In such an embodiment, the functionality of each module would be derived not by having the processor 118 execute program instructions but rather from the customized logic of the hardware logic components. This and other embodiments are within the scope of the present invention.

Functional Overview

Figure 2:
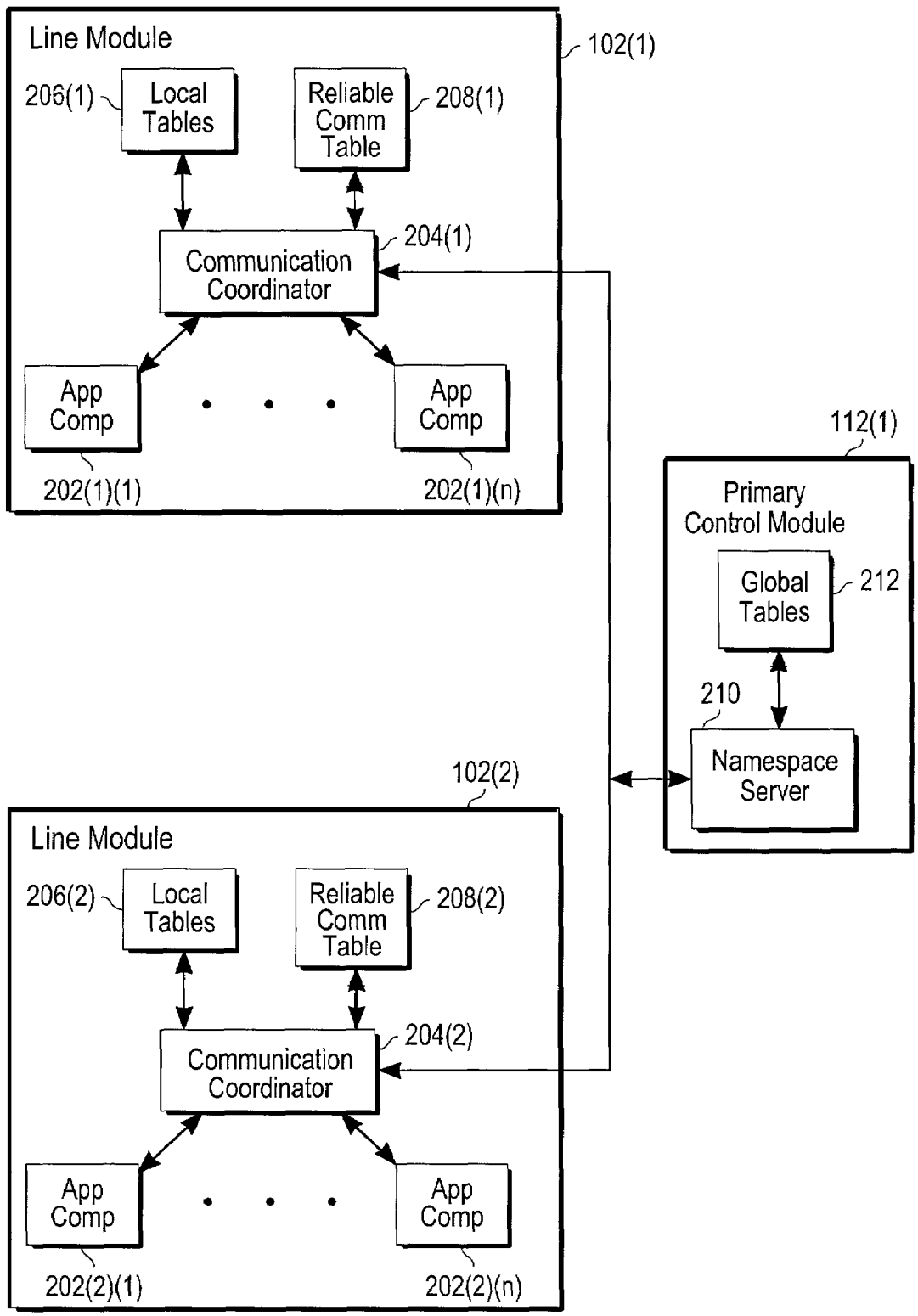
FIG. 2 is a functional block diagram of a portion of the system of FIG. 1, in which the components of a communication facilitation mechanism are shown, along with a plurality of application components that take advantage of the communication facilitation mechanism for inter-module communication.

FIGS. 1A and 1B provide an overview of the hardware components of the switch 100. With reference to FIG. 2, there is a shown an overview of the functional components of the switch 100. For the sake of simplicity, only two line modules 102(1), 102(2) and the primary control module 112(1) are shown in FIG. 2. However, it should be noted that the discussion provided for the modules in FIG. 2 also applies to the other modules in the switch 100.

As shown in FIG. 2, each line module 102(1), 102(2) comprises a plurality of application components 202. In one embodiment, these components 202 are derived from the processor 118 of each line module 102 executing one or more sets of application program instructions. For example, application components 202 may be objects that are instantiated during the execution of applications in an object-oriented environment. Each line module 102 may execute one or more applications; thus, the application components 202 on each line module 102 may be derived from the execution of a single application or from execution of a plurality of applications.

In addition to application components 202, each line module 102 further comprises a communication coordinator 204. In one embodiment, the communication coordinator 204 is derived on each line module 102 by having the processor 118 on that line module execute a set of communication coordinator instructions. As will be explained in greater detail in a later section, the communication coordinator 204 is a component of a communication facilitation mechanism (CFM), and one of its purposes is to facilitate and coordinate communication between the line module on which it resides and any other module in the switch 100. In carrying out its functions, the communication coordinator 204 uses at least two sets of information: (1) a set of local tables 206; and (2) a reliable communication table 208. In one embodiment, each of these sets of tables 206, 208 stores information relevant to a particular line module 102. For example, tables 206(1) and 208(1) store information relevant to line module 102(1), while tables 206(2) and 208(2) store information relevant to line module 102(2). Thus, each set of tables 206, 208 is directed to a particular line module 102. As will be described in greater detail in a later section, the information in these tables 206, 208 is used by each of the corresponding communication coordinators 204 to facilitate inter-module communication.

On the primary control module 112(1), there resides a namespace server 210. In one embodiment, the namespace server 210 is derived from the processor 118 on the control module 112(1) executing a set of namespace server instructions. Like the communication coordinators 204 on the line modules 102, the namespace server 210 is a component of the CFM, and like the communication coordinators 204, a function of the namespace server 210 is to coordinate inter-module communication. One difference between the communication coordinators 204 and the namespace server 210 is that while each of the communication coordinators 204 is concerned with coordinating communication to and from a particular line module 102, the namespace server 210 is concerned with coordinating communication throughout the entire switch 100. In carrying out its functions, the namespace server 210 uses information stored in the global tables 212. In one embodiment, the global tables 212 store a collection of all of the information in all of the local tables 206 of the line modules 102. Thus, the global tables 212 may be viewed as master tables for the switch 100. As will be explained further below, the namespace server 210 uses the information in the global tables 212 to help the communication coordinators 204 populate the local tables 206.

Together, all of the communication coordinators 204 and the namespace server 210 combine to form an overall CFM, which may be viewed as an intermediate communication layer or middleware. This CFM serves a number of different purposes. One of its main purposes is to shield the application components 202 from the complexity of the underlying communication network. With the CFM, the application components 202 are relieved of the burden of knowing the particulars of the network. For example, the application components 202 do not need to know the IP addresses of the various modules in the system, nor do they need to know the manner in which the network is configured. In addition, the CFM eliminates the need for the application components 202 to know where other application components 202 are located. To communicate with or to access another application component 202 on the same or a different line module 102, an application component 202 simply has to send a message to its corresponding communication coordinator 204. The communication coordinator 204 will then perform what is necessary to deliver the message to the other application component 202. By shielding the complexities of the network from the application components 202, the CFM greatly simplifies the logic that has to be implemented by the application components 202.

In addition to serving the shielding function, the CFM also provides rich functionality. This functionality includes but is not limited to the ability to implement a publish/subscribe system of communication, the ability to subscribe to multiple events with a single namespace specification and a single subscription request, the ability to broadcast messages, and the ability to implement reliable communication with an "at most once" message delivery guarantee, just to name a few. With this rich set of functionality, the application components 202 will be able to communicate with each other efficiently and conveniently across module boundaries.

Namespaces

In one embodiment, the application components 202 are shielded from the complexity of the underlying communication network through the use of global namespaces. More specifically, when an application component 202 wishes to communicate with another application component, the application component sends a message to its corresponding communication coordinator 204 specifying a particular namespace. In response, the corresponding communication coordinator 204, in possible cooperation with the namespace server 210, maps that namespace to one or more other application components 202. The corresponding communication coordinator 204 then delivers the message to the one or more communication coordinators 204 corresponding to the one or more other application components 202. Those communication coordinators 204 then in turn deliver the message to the one or more other application components 202. By using a global namespace, and by using the CFM as an intermediary in this manner, application components 202 can communicate with each other without knowing any of the particulars of the underlying communication network.

In one embodiment, a unique global namespace is assigned to each entity in each module of the switch 100. The namespace may, in one embodiment, take on a hierarchical form, similar to that used in file systems. For example, for the application component 202(1)(1) on line module 102(1), the namespace may be "/LM/1/monitor", where the LM indicates that the component resides on a line module, the "1" indicates that it is on line module 1, and "monitor" is the name of the component. Similarly, the namespace for the application component 202(2)(1) may be "/LM/2/foo", where the LM indicates that the component resides on a line module, the "2" indicates that it is on line module 2, and "foo" is the name of the component. Using this or any other naming convention, each entity is assigned a unique namespace in the global namespace.

In addition to names of entities, the global namespace may also be used to designate operations and events associated with each of the entities. In one embodiment, these designations are made by adding more levels to the namespaces of the entities. More specifically, for operations, an "op" level is added to the namespaces. For events, an "event" level is added. For example, suppose application component 202(1)(1) has a "get" operation that it wishes to make available to other components to invoke (an operation may be viewed as a method of an object in an object oriented environment). In such a case, the namespace "/LM/1/monitor/op/get" may be assigned to the operation, where "/LM/1/monitor" identifies the component 202(1)(1), "op" indicates that an operation is being named, and "get" is the name of the operation. Similarly, if the same application component 202(1)(1) publishes an event named "LOS" (loss of signal), then the namespace "/LM/1/monitor/event/LOS" may be assigned to the event, where "/LM/1/monitor"

identifies the component 202(1)(1), "event" indicates that an event is being named, and "LOS" is the name of the event. Using this naming convention, all of the entities, operations, and events in all of the modules of the switch 100 can be conveniently named in the global namespace.

After a namespace is assigned to an entity, operation, or event, that namespace may be used by various components for various purposes. For example, application components 202 may publish events to particular namespaces. Also, application components 202 may subscribe to particular namespaces to receive events that are published to those namespaces. In addition, application components 202 may invoke the operations provided by other application components 202 using namespaces. These and other uses of the namespaces are possible.

Namespace Registration

In one embodiment, before a namespace is generally used by application components 202, use of the namespace is first registered with the communication coordinators 204 and the namespace server 210 of the CFM. This registration process provides the components 204, 210 of the CFM with sufficient information about the namespace so that the CFM will be able to map the namespace to one or more application components 202 in the future for message delivery purposes. In one embodiment, the namespace registration process entails updating the local tables 206 of one or more line modules 102, as well as updating the global tables 212 of the control module 112(1). As noted previously, the local tables 206 comprise information relevant to a particular line module 102. In contrast, the global tables 212 comprise all of the information in all of the local tables 206 of all of the modules. Hence, the global tables 212 act as the master tables for the entire switch 100.

Figure 4A:
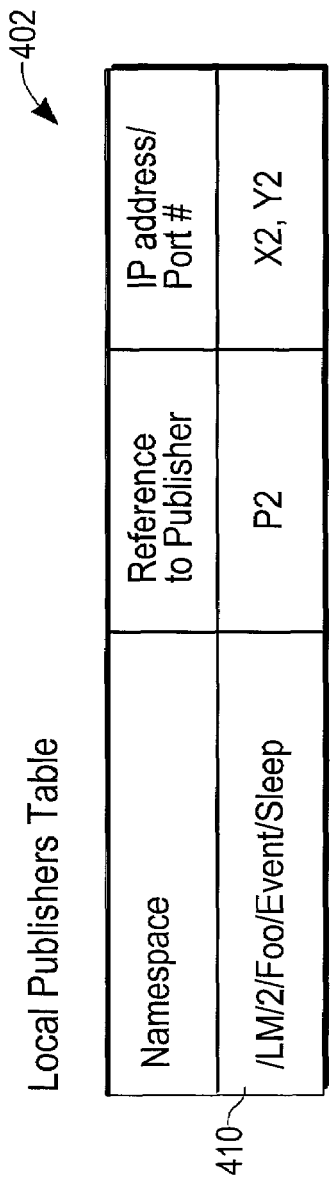
Figure 4B:
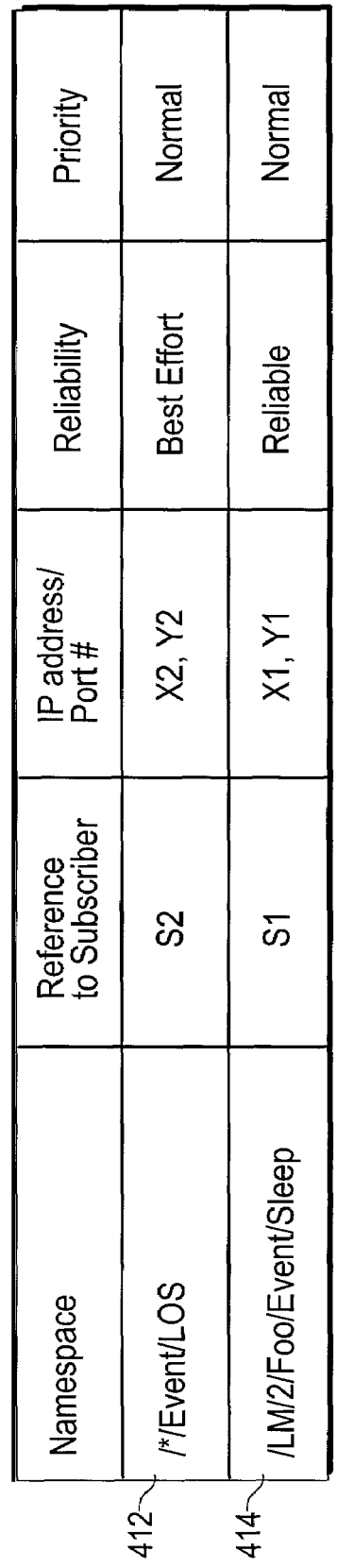

To illustrate the registration process, reference will be made to the specific examples shown in FIGS. 3, 4, and 5. Specifically, FIGS. 3A-3D show the tables that comprise the local tables 206(1) of line module 102(1), FIGS. 4A-4D show the tables that comprise the local tables 206(2) of line module 102(2), and FIGS. 5A-5D show the tables that comprise the global tables 212 of the control module 112(1). In one embodiment, the CFM supports both publish/subscribe communication and client/server operation. Thus, as shown in FIGS. 3, 4 and 5, the local tables 206 and the global tables 212 comprise a plurality of separate tables, including a Publishers table 302, 402, 502, a Subscribers table 304, 404, 504, a Servers table 306, 406, 506, and a Clients table 308, 408, 508. These various tables are used by the CFM to support the different communication/operation models.

In one embodiment, a namespace may be used by an application component 202 in at least four different ways. An application component 202 may: (1) publish an event to a namespace; (2) subscribe to a namespace to receive all events published to that namespace; (3) expose an operation provided by an application component 202 through a namespace (and hence act as a server for that operation); and (4) invoke an operation provided by another application component 202 through a namespace (and hence act as a client for that operation). In one embodiment, each of these uses of a namespace by an application component 202 is registered with the CFM. In the following discussion, the manner in which each of these uses is registered will be described.

Publication/Subscription Registration

To illustrate the publication registration process, suppose that application component 202(1)(1) of FIG. 2 wishes to publish an event to the namespace "LM/1/monitor/event/LOS". To register this use of the namespace, the application component 202(1)(1) sends a publication announcement message to the communication coordinator 204(1). In this message, the application component 202(1)(1) provides: (1) an indication that it is registering to publish an event to the namespace "/LM/1/monitor/event/LOS"; and (2) a reference (P1) back to itself. This reference (which may for example be a pointer) will be used by the communication coordinator 204(1) to communicate with the application component 202(1)(1) if the need arises. In response to the publication announcement message, the communication coordinator 204(1) updates the Local Publishers Table 302 (FIG. 3A) for line module 102(1) by creating a new entry 310 in the table 302. In the new entry 310, the namespace "/LM/1/monitor/event/LOS" is stored in the Namespace column, and the reference (P1) back to the publishing component 202(1)(1) is stored in the "Reference to Publisher" column. In addition, an IP address and port number are stored in the IP Address/Port# column. This is the IP address and port number of the line module 102(1) on which the publishing component 202(1)(1) resides. Assuming the IP address and port number of line module 102(1) are X1 and Y1, respectively, the value pair of X1, Y1 will be stored in the new entry 310. The Local Publishers Table 302 is thus updated.

Thereafter, the communicator coordinator 204(1) proceeds to send a publication announcement message to the control module 112(1) to inform the namespace server 210 of the intended publication to the namespace. In this message, the communication coordinator 204(1) provides: (1) the namespace ("LM/1/monitor/event/LOS") to which publication will be made; (2) the reference P1 back to the publishing component 202(1)(1); and (3) the IP address and port number of the line module 102(1). In response, the namespace server 210 creates a new entry 510 in the Global Publishers Table 502 (FIG. 5A), and stores the above-provided information into the corresponding columns of the entry 510. The Global Publishers Table 502 is thus updated.

Thereafter, the namespace server 210 checks the Global Subscribers Table 504 (FIG. 5B) to determine whether there are any subscribers to the newly registered namespace "LM/1/monitor/event/LOS". If there are subscribers to the namespace, then the namespace server 210 extracts information relating to each of the subscribers from the Global Subscribers Table 504 and sends that information back to the communication coordinator 204(1) associated with the publishing component 202(1)(1). For the time being, however, it will be assumed that entry 518 of the Global Subscribers Table 504 does not yet exist and that there are no current subscribers to the namespace "/LM/1/monitor/event/LOS". Hence, the namespace server 210 sends an empty subscriber list back to the communication coordinator 204(1). The publication registration process is thus completed.

To illustrate the subscription registration process, suppose that application component 202(1)(n) of FIG. 2 wishes to subscribe to the namespace "/LM/2/foo/event/sleep" to receive events published to that namespace. To register this use of the namespace, the application component 202(1)(n) sends a subscription announcement message to the communication coordinator 204(1). In this message, the application component 202(1)(n) provides: (1) an indication that it is registering to subscribe to the namespace "/LM/2/foo/event/sleep"; (2) a reference (S1) back to itself; (3) an indication of what type of reliability is desired; and (4) an indication of a desired priority. In one embodiment, the reliability may be "best effort" or "reliable". If best effort is specified, no acknowledgment of messages is required. If reliable is specified, messages need to be acknowledged. Reliability will be discussed in greater detail in a later section. As to priority, the application components 202(1)(n) may specify normal or high priority. Reliability and priority determine how event messages will be delivered to the subscribing component 202(1)(n) when events are published.

In response to the subscription announcement message, the communication coordinator 204(1) updates the Local Subscribers Table 304 (FIG. 3B) for line module 102(1) by creating a new entry 312. In the new entry 312, the namespace "/LM/2/foo/event/sleep" is stored in the Namespace column, and the reference (S1) back to the subscribing component 202(1)(n) is stored in the "Reference to Subscriber" column. In addition, the IP address and port number (X1, Y1) of the line module 102(1) on which the subscribing component 202(1)(n) resides are stored in the IP Address/Port# column, the reliability indication is stored in the Reliability column, and the priority indication is stored in the Priority column. The Local Subscribers Table 304 is thus updated to reflect the subscription registration.

Thereafter, the communicator coordinator 204(1) sends a subscription announcement message to the control module 112(1) to inform the namespace server 210 of the subscription to the namespace. In this message, the communication coordinator 204(1) provides: (1) the namespace ("LM/2/foo/event/sleep") to which subscription is being made; (2) the reference S1 back to the subscribing component 202(1)(n); (3) the IP address and port number (X1, Y1) of the line module 102(1); (4) the reliability indication; and (5) the priority indication. In response to this message, the namespace server 210 creates a new entry 516 in the Global Subscribers Table 504 (FIG. 5B), and stores the above-provided information into the corresponding columns of the entry 516. The Global Subscribers Table 504 is thus updated to include the new subscription.

Thereafter, the namespace server 210 checks the Global Publishers Table 502 (FIG. 5A) to determine whether there are any publishers that have registered to publish events to the namespace "/LM/2/foo/event/sleep". If there are, then the namespace server 210 informs the communication coordinator 204 associated each of those publishers of the new subscription. For the time being, however, it will be assumed that entry 512 of the Global Publishers Table 502 does not yet exist and that there are no current publishers to the namespace "/LM/2/foo/event/sleep". Hence, the namespace server 210 does not notify any publishers of the new subscription. The subscription registration process is thus completed.

Suppose now that application component 202(2)(n) of FIG. 2 wishes to subscribe to a namespace. However, instead of subscribing to a unique namespace, it wishes to subscribe to potentially a plurality of namespaces. For example, instead of subscribing to a specific LOS namespace such as /LM/1/monitor/event/LOS, which is specific to the application component named "monitor" on line module 1, the component 202(2)(n) may wish to subscribe to all LOS event namespaces regardless of the application component or line module. Using a wildcard character *, this wish may be expressed as /*/event/LOS. In currently available alternatives to the CFM, it is not possible to subscribe to a plurality of events using a single name expression. Rather, a subscriber is required to subscribe to each individual event name separately. For systems with large numbers of events, this approach can quickly become inefficient and non-scalable.

In contrast, in one embodiment of the present invention, there is provided a capability within the CFM to subscribe to multiple namespaces using a single namespace expression and a single subscription registration request. In such an embodiment, the namespace expression may contain wildcard characters, such as *. When processing registration requests involving namespace expressions, the namespace server 210 performs pattern matching to resolve the namespace expressions to determine which specific namespaces match the expressions. Then, the namespace server 210 automatically subscribes to the specific matching namespaces. By processing namespace expressions in this manner, the namespace server 210 makes it possible to subscribe to multiple namespaces using a single relatively simple namespace expression. This in turn can lead to significant efficiency and scalability gains.

Thus far, only the general wildcard * has been discussed as being usable in a namespace expression. It should be noted that the pattern matching capability of the namespace server 210 is not so limited. Rather, the namespace server 210 may perform any type of logical pattern matching. For example, it can find matches for patterns beginning with a particular letter or letters (e.g. M*, or Ma*). It can also resolve expressions having more than one wildcard. For example, the namespace expression /LM/*/*/event/LOS would find all LOS events from all line modules and all application components on those line modules. In addition, it can find matches for wildcards of specific length. For example, for the expression "?mall", the namespace server 210 would find all matches that begin with any one character and ends with "mall". Basically, the namespace server 210 is capable of performing any known type of pattern matching. With this powerful capability, the namespace server 210 greatly facilitates the subscription registration process.

To illustrate how the namespace server 210 implements this capability, reference will now be made to an example. Suppose that application component 202(2)(n) on line module 102(2) wishes to subscribe to the namespace expression "/*/event/LOS" to receive all LOS events published by all application components 202 on all modules. To register use of this namespace expression, the application component 202(2)(n) sends a subscription announcement message to the communication coordinator 204(2). In this message, the application component 202(2)(n) provides: (1) an indication that it is registering to subscribe to the namespace expression "/*/event/LOS"; (2) a reference (S2) back to itself; (3) an indication of what type of reliability is desired; and (4) an indication of a desired priority. In response to the subscription announcement message, the communication coordinator 204(2) updates the Local Subscribers Table 404 (FIG. 4B) for line module 102(2) by creating a new entry 412. In the new entry 412, the namespace expression "/*/event/LOS" is stored in the Namespace column, and the reference (S2) back to the subscribing component 202(2)(n) is stored in the "Reference to Subscriber" column. In addition, the IP address and port number (X2, Y2) of the line module 102(2) on which the subscribing component 202(2)(n) resides are stored in the IP Address/Port# column, the reliability indication is stored in the Reliability column, and the priority indication is stored in the Priority column. The Local Subscribers Table 404 is thus updated to reflect the subscription registration.

Thereafter, the communicator coordinator 204(2) sends a subscription announcement message to the control module 112(1) to inform the namespace server 210 of the subscription to the namespace expression. In this message, the communication coordinator 204(2) provides: (1) the namespace expression "/*/event/LOS"; (2) the reference S2 back to the subscribing component 202(2)(n); (3) the IP address and port number (X2, Y2) of the line module 102(2); (4) the reliability indication; and (5) the priority indication. In response to this message, the namespace server 210 creates a new entry 518 in the Global Subscribers Table 504 (FIG. 5B), and stores the above-provided information into the corresponding columns of the entry 518. The Global Subscribers Table 504 is thus updated to include the new subscription.

Thereafter, the namespace server 210 checks the Global Publishers Table 502 (FIG. 5A) to determine whether there are any publishers that have registered to publish events to namespaces that match the namespace expression "/*/event/LOS". In making this determination, the namespace server 210 in one embodiment performs pattern matching on each of the namespaces in the Global Publishers Table 502 to find all matches for the namespace expression "/*/event/LOS. For each matching namespace, the namespace server 210 informs a corresponding communication coordinator 204 of the new subscription. In the present example, a single matching entry is found, namely the namespace "/LM/1/monitor/event/LOS" found in entry 510. Thus, the namespace server 210 communicates with the communication coordinator 204(1) corresponding to the publishing component 202(1)(1) of that namespace to inform that communication coordinator 204(1) of the new subscription.

To do so, the namespace server 210 in one embodiment, first creates a subscriber message packet. The namespace server 210 stores within this message packet all of the information pertaining to the new subscription. Specifically, in one embodiment, the message includes: (1) the specific namespace "LM/1/monitor/event/LOS" that matched the namespace expression; (2) the reference S2 back to the subscribing component 202(2)(n); (3) the IP address and port number of the line module 102(2) on which the subscribing component 202(2)(n) resides; (4) the reliability indication; and (5) the priority indication. Once created, the packet is addressed to the IP address and port number X1, Y1 (derived from entry 510 of the Global Publishers Table 502 (FIG. 5A)) of the line module 102(1) on which the publishing component 202(1)(1) resides (recall from previous discussion that component 202(1)(1) has registered to publish to the namespace "/LM/1/monitor/event/LOS"). Thereafter, the namespace server 210 sends the message packet to the underlying communication network. Based upon the IP address and port number, the packet is routed to the communication coordinator 204(1) of the line module 102(1) on which the publishing component 202(1)(1) resides.

In response to the subscriber message packet, the communication coordinator 204(1) updates its Local Subscribers Table 304 (FIG. 3B) to include the subscriber information contained in the packet. In this example, the communication coordinator 204(1) creates a new entry 314, and populates the new entry 314 with the subscriber information contained in the packet. Note that entry 314 contains generally the same information as entry 518 of the Global Subscribers Table 504 (FIG. 5), except that rather than having a namespace expression in the namespace column, entry 314 has a specific namespace in that column. Once the new entry 314 is created and populated, the subscription registration process is completed. In this manner, in response to a subscription registration request made by a subscribing component 202(2)(n) on one line module 102(2), subscriber information is sent from the namespace server 210 to the communication coordinator 204(1) on another line module 102(1). In this way, the namespace server 210 maintains publisher/subscriber information throughout the entire switch 100.

In the above example, for the sake of simplicity, only one matching namespace was shown in the Global Publishers Table 502. In many implementations, however, multiple matching namespaces may be found for the same namespace expression. In such cases, the namespace server 210 would, for each matching namespace, communicate with the communication coordinator 204 corresponding to the publisher of that namespace, and inform that communication coordinator 204 of the new subscription. In one embodiment, the namespace server 210 would communicate with each such communication coordinator 204 by sending a subscriber message packet in the manner described above.

To complete discussion of the registration process, suppose now that the application component 202(2)(1) of line module 102(2) wishes to publish an event to the namespace "/LM/2/foo/event/sleep". To register this use of the namespace, the application component 202(2)(1) sends a publication announcement message to the communication coordinator 204(2). In this message, the application component 202(2)(1) provides: (1) an indication that it is registering to publish an event to the namespace "/LM/2/foo/event/sleep"; and (2) a pointer (P2) back to itself. In response to the publication announcement message, the communication coordinator 204(2) updates the Local Publishers Table 402 (FIG. 4A) for line module 102(2) by creating a new entry 410. In the new entry 410, the namespace "/LM/2/foo/event/sleep" is stored in the Namespace column, and the reference (P2) back to the application component 202(2)(1) is stored in the "Reference to Publisher" column. In addition, the IP address and port number (X2, Y2) of the line module 102(2) on which the publishing component 202(2)(1) resides is stored in the IP address/Port# column. The Local Publishers Table 402 is thus updated.

Thereafter, the communicator coordinator 204(2) proceeds to send a publication announcement message to the control module 112(1) to inform the namespace server 210 of the intended publication to the namespace. In this message, the communication coordinator 204(2) provides: (1) the namespace ("LM/2/foo/event/sleep") to which publication will be made; (2) the reference P2 to the publishing component 202(2)(1); and (3) the IP address and port number of the line module 102(2). In response, the namespace server 210 creates a new entry 512 in the Global Publishers Table 502 (FIG. 5A), and stores the above-provided information into the corresponding columns of the entry 512. The Global Publishers Table 502 is thus updated.

Thereafter, the namespace server 210 checks the Global Subscribers Table 504 (FIG. 5B) to determine whether there are any subscribers to the newly registered namespace "/LM/2/foo/event/sleep". In making this determination, the namespace server 210 scans through the table 504, and checks for exact matches of the namespace, as well as pattern matches. Like entry 518, some of the entries in table 504 may contain namespace expressions rather than specific namespaces. For such namespace expressions, the namespace server 210 resolves the expression to determine whether there is a pattern match between the expression and the newly registered namespace. In the present example, a namespace match is found, namely, the namespace stored in entry 516. Since a match is found, thereby meaning that there is a subscriber to the newly registered namespace, the namespace server 210 extracts the information pertaining to the subscriber from the Global Subscribers Table 504 and sends that information to the communication coordinator 204(2) associated with the publishing component 202(2)(1). In this example, there is only one subscriber to the namespace. In cases where there are multiple subscribers, the information pertaining to all of the subscribers will be extracted from the Global Subscribers Table 504 and sent to the communication coordinator 204(2).

To send the subscriber information to the communication coordinator 204(2), the namespace server 210, in one embodiment, creates a subscriber message packet. The namespace server 210 stores within this message packet all of the information extracted from the Global Subscribers Table 504 pertaining to all of the subscribers of the namespace. The packet is then addressed to the IP address and port number X2, Y2 (derived from entry 512 of the Global Publishers Table 502 (FIG. 5A)) associated with the line module 102(2) on which the publishing component 202(2)(1) resides. Thereafter, the packet is sent to the underlying communication network. Based upon the IP address and port number, the packet is routed to the communication coordinator 204(2) of line module 102(2). In response to the message, the communication coordinator 204(2) updates its Local Subscribers Table 404 (FIG. 4B) to include the subscriber information contained in the packet. In this example, the communication coordinator 204(2) creates and populates entry 414 with the subscriber information. Note that entry 414 contains the same information as entry 516 of the Global Subscribers Table 504 (FIG. 5B). In this manner, in response to a publication registration, subscriber information is obtained from the namespace server 210 and stored into the Local Subscribers Table 404. The publication registration process is thus completed.

Client/Server Registration

As noted previously, the CFM is capable of supporting client/server operation as well as publish/subscribe communication. In one embodiment, client/server operation is supported using namespaces, and as is the case with publish/subscribe communication, use of the namespaces is registered before the namespaces are invoked. To illustrate the client/server registration process, reference will be made to an example.

Suppose that application component 202(1)(1) of line module 102(1) (FIG. 2) wishes to register itself as a server for the operation identified by the namespace "/LM/1/monitor/op/get". To register this use of the namespace, the application component 202(1)(1) sends a server announcement message to the communication coordinator 204(1). In this message, the application component 202(1)(1) provides: (1) the namespace "/LM/1/monitor/op/get" for which it will be acting as a server; (2) a reference (P1) back to itself; (3) an indication of what type of message delivery reliability is desired when this operation is invoked; and (4) an indication of a desired priority. In response to the server announcement message, the communication coordinator 204(1) updates the Local Servers Table 306 (FIG. 3C) for line module 102(1) by creating a new entry 320 in the table 306. In the new entry 320, the namespace "/LM/1/monitor/op/get" is stored in the Namespace column, and the reference (P1) back to the server component 202(1)(1) is stored in the "Reference to Server" column. In addition, the IP address and port number (X1, Y1) of the line module 102(1) on which the server component 202(1)(1) resides are stored in the IP Address/Port# column, the reliability indication is stored in the Reliability column, and the priority indication is stored in the Priority column. The Local Servers Table 306 is thus updated.

Thereafter, the communicator coordinator 204(1) proceeds to send a server announcement message to the namespace server 210 of the control module 112(1). In this message, the communication coordinator 204(1) provides: (1) the server namespace ("LM/1/monitor/op/get") being registered; (2) the reference P1 back to the server component 202(1)(1); (3) the IP address and port number (X1, Y1) of the line module 102(1); (4) the reliability indication; and (5) the priority indication. In response to this message, the namespace server 210 creates a new entry 520 in the Global Servers Table 506 (FIG. 5C), and stores the above-provided information into the corresponding columns of the entry 520. The Global Servers Table 506 is thus updated.

Thereafter, the namespace server 210 checks the Global Clients Table 508 (FIG. 5D) to determine whether there are any clients for the newly registered server namespace "LM/1/monitor/op/get". If there are clients for the namespace, then the namespace server 210 provides information pertaining to the server component 202(1)(1) to each communication coordinator 204 associated with each client. For the time being, however, it will be assumed that entry 526 of the Global Clients Table 508 does not yet exist and that there are no current clients for the namespace "/LM/1/monitor/op/get". Hence, the server registration process is thus completed.

To illustrate the client registration process, suppose that application component 202(1)(n) of line module 102(1) wishes to register as a client to the namespace "/LM/2/foo/op/set". To register this use of the namespace, the application component 202(1)(n) sends a client announcement message to the communication coordinator 204(1). In this message, the application component 202(1)(n) provides: (1) the namespace "/LM/2/foo/op/set" to which is it registering to be a client; and (2) a reference (S1) back to itself. In response to the client announcement message, the communication coordinator 204(1) updates the Local Clients Table 308 (FIG. 3D) for line module 102(1) by creating a new entry 324. In the new entry 324, the namespace "/LM/2/foo/op/set" is stored in the Namespace column, and the reference (S1) back to the client component 202(1)(n) is stored in the "Reference to Client" column. In addition, the IP address and port number (X1, Y1) of the line module 102(1) on which the client component 202(1)(n) resides is stored in the IP address/Port # column. The Local Clients Table 308 is thus updated.

Thereafter, the communicator coordinator 204(1) sends a client announcement message to the namespace server 210 of the control module 112(1). In this message, the communication coordinator 204(1) provides: (1) the namespace ("LM/2/foo/op/set") for which registration is being made; (2) the reference S1 back to the client component 202(1)(n); and (3) the IP address and port number (X1, Y1) of the line module 102(1) on which the client component 202(1)(n) resides. In response to this message, the namespace server 210 creates a new entry 524 in the Global Clients Table 508 (FIG. 5D), and stores the above-provided information into the corresponding columns of the entry 524. The Global Clients Table 508 is thus updated.

Thereafter, the namespace server 210 checks the Global Servers Table 506 (FIG. 5C) to determine whether any server has registered to serve the namespace "/LM/2/foo/op/set". If so, then the namespace server 210 provides information pertaining to the server to the communication coordinator 204(1) associated with the client component 202(1)(*n*). For the time being, however, it will be assumed that entry 522 of the Global Servers Table 506 does not yet exist and that there are no current servers for the namespace "/LM/2/foo/op/set". Hence, the namespace server 210 informs the communication coordinator 204(1) that there is currently no server for the namespace "/LM/2/foo/op/set". The client registration process is thus completed.

Suppose now that the application component 202(2)(1) of line module 102(2) wishes to register itself as a server for the namespace "/LM/2/foo/op/set". To register this use of the namespace, the application component 202(2)(1) sends a server announcement message to the communication coordinator 204(2). In this message, the application component 202(2)(1) provides: (1) the namespace "/LM/2/foo/op/set" for which it is registering as a server; (2) a pointer (P2) back to itself; (3) a reliability indication; and (4) an indication of a desired priority. In response to the server announcement message, the communication coordinator 204(2) updates the Local Servers Table 406 (FIG. 4C) for line module 102(2) by creating a new entry 420. In the new entry 420, the namespace "/LM/2/foo/op/set" is stored in the Namespace column, the reference (P2) back to the server component 202(2)(1) is stored in the "Reference to Server" column. In addition, the IP address and port number (X2, Y2) of the line module 102(2) on which the server component 202(2)(1) resides is stored in the IP address/Port# column, the reliability indication is stored in the Reliability column, and the priority indication is stored in the Priority column. The Local Servers Table 406 is thus updated.

Thereafter, the communicator coordinator 204(2) proceeds to send a server announcement message to the namespace server 210 of the control module 112(1). In this message, the communication coordinator 204(2) provides: (1) the namespace ("LM/2/foo/op/set") being registered; (2) the reference P2 back to the server component 202(2)(1); (3) the IP address and port number (X2, Y2) of the line module 102(2) on which the server component 202(2)(1) resides; (4) the reliability indication; and (5) the priority indication. In response to this message, the namespace server 210 creates a new entry 522 in the Global Servers Table 506 (FIG. 5C), and stores the above-provided information into the corresponding columns of the entry 522. The Global Servers Table 506 is thus updated.

Thereafter, the namespace server 210 checks the Global Clients Table 508 (FIG. 5D) to determine whether there are any clients for the newly registered server namespace "/LM/1/foo/op/set". In making this determination, the namespace server 210 scans through the table 508, and checks for all matches of the newly registered server namespace. For each matching namespace (which indicates a client of the server namespace), the namespace server 210 sends a message to a communication coordinator 204 corresponding to the client. The purpose of this message is to pass on, to the communication coordinator 204, information pertaining to the newly registered server namespace. In the present example, a single namespace match is found, namely, the namespace stored in entry 524. Thus, the namespace server 210 sends a message to a single corresponding communication coordinator 204.

To do so, the namespace server 210 in one embodiment, first creates a server message packet. The namespace server 210 stores within this message packet all of the information pertaining to the newly registered server namespace. Specifically, in one embodiment, the message includes: (1) the server namespace "/LM/2/foo/op/set"; (2) the reference P2 back to the server component 202(2)(1); (3) the IP address and port number of the line module 102(2) on which the server component 202(2)(1) resides; (4) the reliability indication; and (5) the priority indication. Once created, the packet is addressed to the IP address and port number X1, Y1 (derived from entry 524 of the Global Clients Table 508 (FIG. 5D)) of the line module 102(1) on which the client component 202(1)(*n*) resides (recall from previous discussion that component 202(1)(*n*) has registered as a client to the namespace "/LM/2/foo/op/set"). Thereafter, the namespace server 210 sends the message to the underlying communication network. Based upon the IP address and port number, the packet is routed to the communication coordinator 204(1) of the line module 102(1) on which the client component 202(1)(*n*) resides.

In response to the message, the communication coordinator 204(1) updates its Local Servers Table 306 (FIG. 3C) to include the server information contained in the packet. In this example, the communication coordinator 204(1) creates a new entry 322 and populates its with the server information contained in the packet. Note that entry 322 contains the same information as entry 522 of the Global Servers Table 506 (FIG. 5C). Once the new entry 322 is created and populated, the server registration process is completed. In this manner, in response to a server registration request made by a server component 202(2)(1) on one line module 102(2), server information is sent from the namespace server 210 to the communication coordinator 204(1) on another line module 102(1). In this way, the namespace server 210 maintains client/server information throughout the entire switch 100.

In the above example, for the sake of simplicity, only one matching namespace was shown in the Global Clients Table 508. In many implementations, however, multiple matching namespaces (i.e. multiple clients) may be found. In such cases, the namespace server 210 would, for each matching namespace, send a server message packet to a corresponding communication coordinator 204, in the manner described above.

Suppose now that application component 202(2)(*n*) of line module 102(2) wishes to register as a client to the namespace "/LM/1/monitor/op/get". To register this use of the namespace, the application component 202(2)(*n*) sends a client announcement message to the communication coordinator 204(2). In this message, the application component 202(2)(*n*) provides: (1) the namespace "/LM/1/monitor/op/get" to which is it registering to be a client; and (2) a reference (S2) back to itself. In response to the client announcement message, the communication coordinator 204(2) updates the Local Clients Table 408 (FIG. 4D) for line module 102(2) by creating a new entry 424. In the new entry 424, the namespace "/LM/1/monitor/op/get" is stored in the Namespace column, and the reference (S2) back to the client component 202(2)(*n*) is stored in the "Reference to Client" column. In addition, the IP address and port number (X2, Y2) of the line module 102(2) on which the client component 202(2)(*n*) resides is stored in the IP address/Port # column. The Local Clients Table 408 is thus updated.

Thereafter, the communicator coordinator 204(2) sends a client announcement message to the namespace server 210 of the control module 112(1). In this message, the communication coordinator 204(2) provides: (1) the namespace ("LM/1/monitor/op/get") for which registration is being made; (2) the reference S2 back to the client component 202(2)(*n*); and (3) the IP address and port number (X2, Y2) of the line module 102(2) on which the client component 202(2)(*n*) resides. In response to this message, the namespace server 210 creates a new entry 526 in the Global Clients Table 508 (FIG. 5D), and stores the above-provided information into the corresponding columns of the entry 526. The Global Clients Table 508 is thus updated.

Thereafter, the namespace server 210 checks the Global Servers Table 506 (FIG. 5C) to determine whether any server has registered to service the namespace "/LM/1/monitor/op/get". If so, then the namespace server 210 extracts information pertaining to the server from the Global Servers Table 506, and provides that information to the communication coordinator 204(2) associated with the client component 202(2)(n). In the present example, there is a registered server for the namespace "/LM/1/monitor/op/get" (entry 520). Thus, the namespace server 210 sends information pertaining to this server to the communication coordinator 204(2).

To do so, the namespace server 210, in one embodiment, creates a server message packet. The namespace server 210 stores within this message packet all of the information extracted from entry 520 of the Global Servers Table 506. The packet is then addressed to the IP address and port number X2, Y2 (derived from entry 526 of the Global Clients Table 508 (FIG. 5D)) associated with the line module 102(2) on which the client component 202(2)(n) resides. Thereafter, the packet is sent to the underlying communication network. Based upon the IP address and port number, the packet is routed to the communication coordinator 204(2) of line module 102(2). In response to the message, the communication coordinator 204(2) updates its Local Servers Table 406 (FIG. 4C) to include the server information contained in the packet. In this example, the communication coordinator 204(2) creates and populates entry 422. Note that entry 422 contains the same information as entry 520 of the Global Servers Table 506 (FIG. 5C). In this manner, in response to a client registration, server information is obtained from the namespace server 210 and stored into the Local Servers Table 406.

Operation

After namespaces are properly registered with the communication coordinators 204 and the namespace server 210, the CFM is ready for normal operation. At this point, it should be noted that in one embodiment, registration for publication and server invocation are optional. That is, if so desired, an application component 202 may publish an event to a namespace without first registering as a publisher to that namespace. Likewise, an application component 202 may invoke an operation associated with a namespace without first registering as a client for that namespace. If an application component 202 chooses to forego the registration process, then the first time it publishes to a namespace or invokes an operation associated with a namespace, the CFM will, in one embodiment, automatically perform the registration process described above. After the namespace is registered, the CFM will proceed to carry out the publication or invocation functions.

Publish/Subscribe Communication

To illustrate how publish/subscribe communication is implemented by the CFM in accordance with one embodiment of the present invention, reference will be made to an example. The following example will refer to the sample tables shown in FIGS. 3A-3B, as well as the functional block diagram shown in FIG. 2.

Suppose that application component 202(1)(1) wishes to publish an event to namespace "/LM/1/monitor/event/LOS". To do so, it sends a publication message to communication coordinator 204(1). In this message, the publishing component 202(1)(1) provides: (1) the namespace to which it is publishing; (2) the content of the message (e.g. event data); and (3) a desired publication mode. In one embodiment, a message may be published in broadcast or unicast mode. For the time being, it will be assumed that the publishing component specifies unicast mode.

In response to the publication message, the communication coordinator 204(1) scans the Local Subscribers Table 304 in search of all subscribers to the namespace specified in the publication message. In the present example, only one subscriber is found, namely, the one specified in entry 314 of table 304. In other circumstances, however, multiple subscribers may be found. For each subscriber (i.e. each matching entry) found in the Local Subscribers Table 304, the communication coordinator 204(1) performs the following.

Initially, the communication coordinator 204(1) extracts information from the various columns of the matching entry 314, including the reference (S2) to the subscribing component (recall from previous discussion that the subscribing component is component 202(2)(n) of line module 102(2)), the IP address and port number (X2, Y2) of the line module 102(2) on which the subscribing component resides, the reliability indication, and the priority indication. Thereafter, the communication coordinator 204(1), in one embodiment, creates a publication message packet. Within this packet, the communication coordinator 204(1) stores: (1) the namespace to which publication is being made; (2) the message content received from the publishing component 202(1)(1); (3) the reference (S2) to the subscribing component 202(2)(n); (4) the reliability specified in the matching entry 314; (5) the priority specified in the matching entry 314, and (6) the IP address and port number (X1, Y1) of the line module 102(1) on which the publishing component 202(1)(1) resides. The communication coordinator 204(1) then addresses the message packet to the IP address and port number (X2, Y2) of the module 102(2) on which the subscribing component 202(2)(n) resides, and sends the packet into the communication network in accordance with the reliability and priority specified in the matching entry. In the present example, the specified reliability is "best effort"; thus, the communication coordinator 204(1) does not expect any acknowledgment of the message packet. Based upon the IP address and port number, the message packet is routed to the communication coordinator 204(2) of line module 102(2).

Upon receiving the publication message packet, the communication coordinator 204(2) in one embodiment performs several functions. Initially, it determines based upon the reliability indication contained in the message packet whether an acknowledgment needs to be sent back to the originating communication coordinator 204(1). In this example, the reliability is "best effort"; thus, no acknowledgment of the message needs to be sent. Thereafter, the communication coordinator 204(2) creates a publication message to be forwarded to the subscribing component 202(2)(n). In one embodiment, the communication coordinator 204(2) inserts into this message: (1) the namespace to which publication is being made; and (2) the message content provided by the publishing component 202(1)(1). Once the publication message is created, the communication coordinator 204(2) accesses the subscribing component 202(2)(n) using the subscriber reference S2 provided by the originating communication coordinator 204(1), and forwards the publication message to the subscribing component 202(2)(n). The publication is thus delivered to the subscribing component 202(2)(n). This process is used to deliver the event to each subscriber of the namespace to which publication is being made.

Broadcast

In the above example, the originating communication coordinator 204(1) creates and sends a publication message packet to each subscriber of the namespace "/LM/1/monitor/evert/LOS" found in the Local Subscribers Tables 304. If there had been multiple subscribers, multiple message packets would have been sent, one after the other, such that a series of message packets would have been sent by the communication coordinator 204(1). This is how publication is carried out in unicast mode. Currently available CFM's use unicast mode to publish events to multiple subscribers. One of the drawbacks of unicast mode is that it can lead to significant delays between the time an event is published and the time a communication coordinator 204 actually sends a publication message packet to a subscriber. More specifically, because the communication coordinator 204 sends a publication message packet to one subscriber at a time, if there is a long list of subscribers to a particular namespace, the communication coordinator 204 may take a relatively long time before it sends a publication message packet to the last subscriber on the list. For some events (such as loss of signal) in which fast response time is important, unicast mode may not be able to publish an event fast enough to all subscribers.

To overcome this problem, there is provided in one embodiment of the CFM a capability to broadcast rather than unicast an event to a namespace. In broadcast mode, a communication coordinator 204 does not send one publication message packet at a time to each subscriber. Instead, the communication coordinator 204 sends a single publication message packet concurrently to each and every other communication coordinator 204 in the CFM. It is then up to each receiving communication coordinator 204 to determine whether there are subscribers for the namespace, and to deliver the event message to those subscribers. By broadcasting an event in this manner, event messages can reach a large number of subscribers more quickly.

To illustrate how broadcast mode is implemented in accordance with one embodiment of the present invention, suppose that application component 202(1)(1) wishes to broadcast an event to namespace "/LM/1/monitor/event/LOS". To do so, the publishing component 202(1)(1) sends a publication message to communication coordinator 204(1). In this message, the publishing component 202(1)(1) provides: (1) the namespace to which it is publishing; (2) the content of the message (e.g. event data); and (3) an indication that the event is to be broadcasted.

In response to the publication message, the communication coordinator 204(1) creates a broadcast message packet. Within this packet, the communication coordinator 204(1) stores: (1) the namespace to which publication is being made; (2) the message content received from the publishing component 202(1)(1); and (3) an indication that the message is a broadcast message. Thereafter, the communication coordinator 204(1) addresses the message packet to a special IP address that is reserved for broadcasts, and sends the packet into the communication network. Based upon the special IP address, the broadcast message packet is concurrently routed by the network to every other communication coordinator 204 of every other module in the switch 100.

Upon receiving the broadcast message packet, each communication coordinator 204 performs the following operations. For the sake of simplicity, only the operations performed by the communication coordinator 204(2) of line module 102(2) will be described. However, it should be noted that the following description applies to all of the communication coordinators 204 in the CFM.

Based upon the broadcast indication included in the broadcast message packet, the communication coordinator 204(2) determines that the packet contains a broadcast message. In response to this determination, the communication coordinator 204(2) extracts the namespace from the message packet. Using this namespace, the communication coordinator 204(2) searches through the Local Subscribers Table 404 (FIG. 4B) of line module 102(2) for all matching namespaces. In doing so, the communication coordinator 204(2) may encounter not just specific namespaces in the table 404 but also namespace expressions, such as that found in entry 412. If a namespace expression is encountered, then in one embodiment the communication coordinator 204(2) performs pattern matching to determine whether the namespace expression matches the namespace extracted from the packet. In the present example, the namespace expression in entry 412 does match the extracted namespace. Thus, a matching entry is found.

For each matching entry in the Local Subscribers Table 404, the communication coordinator 204(2) creates a publication message to be forwarded to a corresponding subscribing component. In one embodiment, the communication coordinator 204(2) inserts into this message: (1) the namespace to which publication is being made; and (2) the message content provided by the publishing component 202(1)(1). Once the publication message is created, the communication coordinator 204(2) accesses the subscribing component 202(2)(n) using the subscriber reference S2 stored in the "Reference to Subscriber" column of the matching entry, and forwards the publication message to the subscribing component 202(2)(n). The broadcast message is thus delivered to the subscribing component 202(2)(n). By broadcasting a message to all communication coordinators 204, and by having each communication coordinator 204 deliver the message to the appropriate local subscribers in this manner, the CFM makes it possible to deliver a message to a large number of subscribers in a very short amount of time.

Client/Server Operation

As noted above, the CFM is able to support client/server operation as well as publish/subscribe communication. To illustrate how client/server operation is implemented in accordance with one embodiment of the present invention, reference will be made to an example. The following example will refer to the sample tables shown in FIGS. 3C-3D, as well as the functional block diagram shown in FIG. 2.

Suppose that application component 202(1)(n) wishes to invoke the operation associated with the namespace "/LM/2/foo/op/set". To do so, it sends an invocation message to communication coordinator 204(1). In this message, the client component 202(1)(n) provides: (1) the namespace that is being invoked; (2) any information, parameters, or data that are needed to invoke the operation; and (3) a reference S1 back to itself (the client component 202(1)(n).

In response to the invocation message, the communication coordinator 204(1) scans the Local Servers Table 306 (FIG. 3C) in search of the server for the namespace specified in the invocation message. In the present example, the server is found in entry 322 of the table 306. Once the server entry 322 is found, the communication coordinator 204(1) extracts information from the various columns of the entry 322, including the reference (P2) to the server component (recall from previous discussion that the server component is component 202(2)(1) of line module 102(2)), the IP address and port number (X2, Y2) of the line module 102(2) on which the server component resides, the reliability indication, and the priority indication.

Thereafter, the communication coordinator 204(1), in one embodiment, creates an invocation message packet. Within this packet, the communication coordinator 204(1) stores: (1) the namespace that is being invoked; (2) the information, parameters, and data provided by the client component 202(1)(n); (3) the reference (P2) to the server component 202(2)(1); (4) the reliability specified in the server entry 322; (5) the priority specified in the server entry 322, (6) the reference (S1) to the client component 202(1)(n); and (7) the IP address and port number (X1, Y1) of the line module 102(1) on which the client component 202(1)(n) resides. The communication coordinator 204(1) then addresses the message packet to the IP address and port number (X2, Y2) of the module 102(2) on which the server component 202(2)(1) resides, and sends the packet into the communication network in accordance with the reliability and priority specified in the server entry 322. In the present example, the specified reliability is "best effort"; thus, the communication coordinator 204(1) does not expect any acknowledgment of the message packet. Based upon the IP address and port number, the message packet is routed to the communication coordinator 204(2) of line module 102(2).

Upon receiving the invocation message packet, the communication coordinator 204(2) in one embodiment performs several functions. Initially, it determines based upon the reliability indication contained in the message packet whether an acknowledgment needs to be sent back to the originating communication coordinator 204(1). In this example, the reliability is "best effort"; thus, no acknowledgment of the message needs to be sent. Thereafter, the communication coordinator 204(2) saves some of the information contained within the invocation message packet. In one embodiment, this saved information includes the reliability indication, the priority indication, the IP address and port number (X1, Y1) of the line module 102(1) on which the client component 202(1)(n) resides, and the reference (S1) to the client component 202(1)(n). After saving the information, the communication coordinator 204(2) assigns a correlation tag to the saved information, which in effect is a reference to where the saved information can be found. After that is done, the communication coordinator 204(2) creates an invocation message to be forwarded to the server component 202(2)(1). In one embodiment, the communication coordinator 204(2) inserts into this message: (1) the namespace that is being invoked; (2) the information, parameters, and data provided by the client component 202(1)(n); and (3) the correlation tag. Once the invocation message is created, the communication coordinator 204(2) accesses the server component 202(2)(1) using the server reference P2 provided by the originating communication coordinator 204(1), and forwards the invocation message to the server component 202(2)(1) for processing.

Assuming that the operation being invoked is one that gives rise to a response, the server component 202(2)(1) will at some point send a response message to the communication coordinator 204(2) to be forwarded to the client component 202(1)(n). In one embodiment, this response message includes: (1) the namespace that was invoked; (2) the response information/data; and (3) the correlation tag.

Upon receiving this message, the communication coordinator 204(2) uses the correlation tag to access the saved information. Thereafter, the communication coordinator 204(2) creates a response message packet. Within this message packet, the communication coordinator stores: (1) the namespace that was invoked; (2) the response information/data; (3) the reference (S1) to the client component 202(1)(n); (4) the reliability indication; (5) the priority indication; and (6) the IP address and port number of the line module 102(2) on which the server component 202(2)(1) resides. The communication coordinator 204(2) then addresses the response message packet to the IP address and port number (X1, Y1) of the module 102(1) on which the client component 202(1)(n) resides, and sends the packet into the communication network in accordance with the specified reliability and priority. In the present example, the specified reliability is "best effort"; thus, the communication coordinator 204(2) does not expect any acknowledgment of the response message packet. Based upon the IP address and port number, the message packet is routed to the communication coordinator 204(1) of line module 102(1).

Upon receiving the response message packet, the communication coordinator 204(1) in one embodiment performs several functions. Initially, it determines based upon the reliability indication contained in the message packet whether an acknowledgment needs to be sent. In this example, the reliability is "best effort"; thus, no acknowledgment of the message needs to be sent. Thereafter, the communication coordinator 204(1) creates a response message to be forwarded to the client component 202(1)(n). In one embodiment, the communication coordinator 204(1) inserts into this message: (1) the namespace that was invoked; and (2) the response information/data provided by the server component 202(2)(1). Once the response message is created, the communication coordinator 204(1) accesses the client component 202(1)(n) using the client reference S1, and forwards the response message to the client component 202(1)(n). The response is thus delivered to the client component 202(1)(n) to complete the client/server operation.

Reliable Communication

In certain circumstances, it is desirable to implement reliable communication to ensure that important messages are received. With reliable communication, each message (except for an acknowledgment message) is acknowledged. If a sender does not receive an acknowledgment to a message, it continues to resend the message (up to a certain number of times) until an acknowledgment is received. That way, the sender ensures that the message is properly delivered to a recipient.

With reliable communication, there is a risk that a message will be delivered multiple times to a recipient. For example, suppose that a sender sends a message to a recipient, which is received and processed by the recipient. In response, the recipient sends an acknowledgment to the sender, but the acknowledgment is somehow lost and hence not received by the sender. Since an acknowledgment was not received, the sender will resend the message. If the message is again received and processed by the recipient, then the message will be processed twice. For certain implementations, such as database updates, this is a highly undesirable result.

To overcome this problem, one embodiment of the CFM provides an ability to implement reliable communication with an "at most once" guarantee. That is, the CFM ensures that a message will be delivered no more than one time to a recipient. In one embodiment, the CFM is capable of implementing "at most once" reliable communication in both publish/subscribe communication and client/server operation. To illustrate how reliable communication may be implemented in accordance with one embodiment of the present invention, reference will be made to the sample tables 208(1) and 208(2) shown in FIGS. 6 and 7, as well as the functional diagram shown in FIG. 2. FIG. 6 shows a sample embodiment for the local Reliable Communication Table 208(1) of line module 102(1), and FIG. 7 shows a sample embodiment for the local Reliable Communication Table 208(2) of line module 102(2).

Reliable Communication Initialization

In one embodiment, before reliable communication is carried out between two modules, an initialization process is carried out between the communication coordinators 204 of the two modules. To describe the initialization process, reference will be made to communication coordinators 204 (1) and 204(2) on line modules 102(1) and 102(2), respectively. While communication coordinators 204(1) and 204 (2) are used specifically in the following discussion, it should be noted that the discussion applies to all communication coordinators 204 on all modules of the switch 100.

In one embodiment, the first time that reliable communication is carried out between two communication coordinators 204(1), 204(2), some coordination information is exchanged, and used to update the respective Reliable Communication Tables 208(1), 208(2). In one embodiment, the exchanged information comprises a set of sequence numbers. More specifically, each communication coordinator 204, in one embodiment, randomly generates a sending sequence number, and provides it to the other communication coordinator. Thereafter, the sequence numbers are stored into the respective Reliable Communication Tables 208, along with other information.

Assuming that reliable communication is being initiated between the communication coordinators 204(1) and 204(2), the initialization process may be carried out as follows. Initially, the communication coordinator 204(1) sends an INIT message packet to the other communication coordinator 204(2) to initiate reliable communication. Included in this message packet is a sending sequence number (2040 in this example) that the communication coordinator 204(1) has randomly generated. Also included in the message packet is the IP address and port number of the line module 102(1) on which the initiating communication coordinator 204(1) resides. In addition to sending the INIT message packet, the communication coordinator 204(1) also creates and populates an entry 610 in the local Reliable Communication Table 208(1) (FIG. 6). Specifically, it stores: (1) the IP address and port number (X2, Y2) of the line module 102(2) on which the other communication coordinator 204 (2) resides into the IP Address/Port# column; and (2) the sending sequence number (2040) that it just generated into the Sending Sequence column.

In response to the INIT message packet, the other communication coordinator 204(2) randomly generates its own sending sequence number (50 in this example). The communication coordinator 204(2) then creates and populates an entry 710 in its local Reliable Communication Table 208(2) (FIG. 7). Specifically, it stores: (1) the IP address and port number (X1, Y1) of the line module 102(1) on which the initiating communication coordinator 204(1) resides into the IP Address/Port# column; (2) the sending sequence number (50) that it just generated into the Sending Sequence # column; and (3) the sequence number (2040) received from the initiating communication coordinator 204(1) into the Receiving Sequence # column. Thereafter, the communication coordinator 204(2) sends a return message packet to the initiating communication coordinator 204(1). Included in this message packet are the sequence number (50) that the communication coordinator 204(2) just generated, and the IP address and port number (X2, Y2) of the line module 102(2) on which the communication coordinator 204(2) resides.

In response to the return message packet, the initiating communication coordinator 204(1) extracts the IP address and port number (X2, Y2) from the return message, and uses them to look up the proper entry 610 in the local Reliable Communication Table 208(1) (FIG. 6). Once the proper entry 610 is found, the sequence number (50) received from the other communication coordinator 204(2) is stored into the Receiving Sequence # column of the entry 610. The initialization process is thus completed. The communication coordinators 204(1) and 204(2) are now ready to carry out reliable communication with each another.

Sending and Receiving a Reliable Communication

Suppose now that the communication coordinator 204(1) wishes to send a reliable message to communication coordinator 204(2), which resides on line module 102(2) having IP address and port number X2, Y2. This message may, for example, be a publication message from one of the application components 202(1)(1)-202(1)(n) on line module 102 (1) to one of the application components 202(2)(1)-202(2) (n) on line module 102(2), or it may be an operation invocation made by one of the application components 202(1)(1)-202(1)(n) on line module 102(1) to one of the application components 202(2)(1)-202(2)(n) on line module 102(2). In either case, to send the message, the communication coordinator 204(1) first creates a message packet. Depending upon the type of message, this message packet comprises all of the information described above in connection with publish/subscribe communication and client/server operation.

In addition to this information, the message packet also includes a sequence number. In one embodiment, this sequence number is derived by incrementing a current sending sequence number. In the current example, the communication coordinator 204(1) accesses the local Reliable Communication Table 208(1) (FIG. 6) to find the entry 610 corresponding to the IP address and port number (X2, Y2) of the line module 102(2) on which the other communication coordinator 204(2) resides. Once the proper entry 610 is found and accessed, the communication coordinator 204(1) obtains the current sending sequence number (2040) from the entry 610, and increments it to derive 2041. This is the sequence number that is inserted into the message packet. The new sequence number 2041 is also stored back into the Sending Sequence # column of the entry 610 to update the entry 610. After the new sending sequence number is included in the message packet, the message packet is sent into the communication network, and unless an error occurs, is routed to communication coordinator 204(2) of line module 102(2). After sending the message packet, the communication coordinator 204(1) waits for an acknowledgment. If one is not received within a certain amount of time, the communication coordinator 204(1) resends the message. This continues until either an acknowledgment message is received, or the message packet has been sent a maximum number of times. If receipt of the message packet is not eventually acknowledged, the communication coordinator 204(1) informs the application component 202(1)(1)-202(1) (n) that sent it the message that message delivery failed.

Assuming that no error occurs, the communication coordinator 204(2) receives the message packet, and upon receiving the message packet, the communication coordinator 204(2) determines from the contents of the message that reliable communication is desired (recall from previous discussion that a reliability indication is included in a message packet). Thus, it sends an acknowledgment message packet back to the originating communication coordinator 204(1) to confirm that it has received the message packet. Thereafter, the communication coordinator 204(2) extracts the IP address and port number of module 102(2) from the message packet, and uses these to find and access the proper entry 710 in the local Reliable Communication Table 208(2). From the entry 710, the communication coordinator 204(2) obtains the current receiving sequence number from the Receiving Sequence # column. The current receiving sequence number is then compared against the sequence number included in the message packet to determine the next action. In one embodiment, at least three scenarios may arise.

A first scenario is that the sequence number 2041 in the message packet is one greater than the current receiving sequence number 2040 in the entry 710, as is the case in this example. If this is the case, then it means that no error occurred. Thus, the communication coordinator 204(2): (1) updates the entry 710 by storing the new sequence number 2041 into the Receiving Sequence # column; and (2) delivers the message to the appropriate application component 202(2)(1)-202(2)(n) using a component reference, in the same manner as that described previously. Reliable communication is thus achieved.

A second scenario that may arise is that the sequence number in the message packet is greater than the current sequence number by more than one. If that is the case, then it means that one or more intermediate messages were not delivered properly. For example, if the sequence number in the message packet is 2043 and the current receiving sequence number is 2040, then it means that the messages having sequence numbers 2041 and 2040 were not delivered properly. In such a scenario, the communication coordinator 204(2) performs at least three operations. First, it adds the intermediate sequence numbers (e.g. 2041, 2042) to the Missing Sequence Number List column of entry 710 (if those sequence numbers are not already on the list). Second, it updates the entry 710 by storing the new sequence number (e.g. 2043) into the Receiving Sequence # column. In addition, it delivers the message to the appropriate application component 202(2)(1)-202(2)(n) using a component reference, in the same manner as that described previously. In this manner, the entry 710 is maintained/updated, and the message is delivered to the proper component 202(2)(1)-202(2)(n).

A third scenario that may arise is that the sequence number in the message packet is smaller than the current receiving sequence number in entry 710. If that is the case, then it means that the message packet is being delivered out of sequence. To determine what actions to take, the communication coordinator 204(2) checks the missing sequence number list of entry 710. If the sequence number in the message packet is one of the numbers in the missing sequence number list, then it means that this message packet has not been received before. Thus, the communication coordinator 204(2) delivers the message to the appropriate application component 202(2)(1)-202(2)(n) using a component reference, in the same manner as that described previously. In addition, the communication coordinator 204(2) removes the sequence number in the message packet from the missing sequence number list of entry 710. In this manner, the entry is properly maintained/updated, and the message is properly delivered.

On the other hand, if the sequence number in the message packet is not one of the numbers in the missing sequence number list, then it means that this message packet has been received before, and hence, the message has already been delivered to the proper component 202(2)(1)-202(2)(n). That being the case, the communication coordinator 204(2) discards the message packet, and foregoes delivery of the message to any of the application components 202(2)(1)-202(2)(n). By doing so, the communication coordinator 204(2) prevents multiple deliveries of the same message. In this manner, the communication coordinator 204(2) enforces the "at most once" reliable communication guarantee.

At this point, it should be noted that although the invention has been described with reference to one or more specific embodiments, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A method for optimizing a publish/subscribe communication system within a network switch, wherein the network switch has at least a plurality of line modules for communicating data from trunk lines through the switch to other remote trunk lines across respective line modules across a first communication network, and said network switch has a second communication network separate from said first communication network for connecting outside of said first communication network at least a switching module in said network switch to at least a first and second line module of the plurality of line modules, said method comprising:

providing said network switch with a first communication coordinator within said first line modules and a second communication coordinator within said second line modules, said first and second line modules being connected by at least said second communication network;

providing said first communication coordinator with at least a first application component;

generating a subscription request in said at least one application component;

sending a request based on said subscription request from said first communication coordinator to a control module connected to said plurality of line modules, said request comprising an event expression which may be resolved to match a plurality of different event names;

said control module determining from said request a set of information pertaining to a publisher on a second line module, said set of information comprising a particular event name to which said publisher publishes; and resolving said set of information within said control module to determine whether said particular event name constitutes a match for said event expression, thereby determining whether said subscription request is a request to receive one or more publications made to said particular event name;

in response to a determination that said particular event name constitutes a match for said event expression, providing said set of information pertaining to said subscriber to said second communication coordinator;

in response to said second communication coordinator receiving said set of information pertaining to said subscriber, said second communicator sending an event information published for said event name to said first communication controller; said first line module receiving said event information across said second communication network and determining whether to execute a predetermined set of program instructions to affect a change in the communication across the network switch first communication network based on the value of the event information.

2. The method of claim 1, wherein said event expression comprises one or more wildcard indicators.

3. The method of claim 2, wherein resolving said event expression comprises:
performing pattern matching between said event expression and said particular event name.

4. The method of claim 1, further comprising:
accessing a set of information pertaining to a second publisher, said set of information pertaining to said second publisher comprising a second particular event name to which said second publisher publishes;
resolving said event expression to determine whether said second particular event name constitutes a match for said event expression, thereby determining whether said subscription request is a request to receive one or more publications made to said second particular event name; and
in response to a determination that said second particular event name constitutes a match for said event expression, providing said set of information pertaining to said subscriber to a second communication coordinator associated with said second publisher.

5. The method of claim 4, wherein said first particular event name and said second particular event name are different event names.

6. The method of claim 1, wherein each of said plurality of line modules include a local table in which is stored information pertaining to a particularly one of said plurality of line modules.

7. The method of claim 1, wherein the control module includes a namespace server that includes a global table containing all local table information from each of said plurality of line modules, the namespace server using information in the global table to coordinate communication throughout the network switch.

8. A method for optimizing a publish/subscribe communication system within a network switch, wherein the network switch has at least a plurality of line modules for communicating data from trunk lines through the switch to other remote trunk lines across respective line modules across a first communication network, and said network switch has a second communication network separate from said first communication network for connecting outside of said first communication network at least a switching module in said network switch to at least a first and second line module of the plurality of line modules, said method comprising:
providing said network switch with a first communication coordinator within said first line modules and a second communication coordinator within said second line modules, said first and second line modules being connected by at least said second communication network;
providing said first communication coordinator with at least a first application component;
generating a publication announcement in said at least one application component;
receiving an announcement based on said publication announcement from said first communication coordinator in a control module connected to said plurality of line modules, said announcement comprising an event expression which may be resolved to match a plurality of different event names;
said control module determining from said announcement a set of information pertaining to a subscriber on a second line module, said set of information comprising a particular event name to which said publisher publishes; and
resolving said set of information within said control module to determine whether said particular event name constitutes a match for said event expression, thereby determining whether said subscriber should receive one or more publications made to said particular event name;
in response to a determination that said particular event name constitutes a match for said event expression, providing said set of information pertaining to said subscriber to said first communication coordinator;
in response to said first communication coordinator receiving said set of information pertaining to said subscriber, said first communicator sending an event information published for said event name to said second communication controller; said second line module receiving said event information across said second communication network and determining whether to execute a predetermined set of program instructions to affect a change in the communication across the network switch first communication network based on the value of the event information.

9. The method of claim 8, wherein said event expression comprises one or more wildcard indicators.

10. The method of claim 8, wherein resolving said event expression comprises:
performing pattern matching between said event expression and said particular event name.

11. The method of claim 8, wherein said event expression comprises a hierarchical namespace.

12. The method of claim 11, wherein said hierarchical namespace comprises one or more wildcard indicators in one or more hierarchical levels of said hierarchical namespace.

13. The method of claim 12, further comprising:
receiving a second publication announcement indicating a desire to publish to a second particular event name;
accessing said set of information pertaining to said subscriber;
resolving said event expression to determine whether said second particular event name constitutes a match for said event expression, thereby determining whether said subscriber should receive one or more publications made to said second particular event name; and
in response to a determination that said second particular event name constitutes a match for said event expression, providing said set of information pertaining to said subscriber to a sender of said second publication announcement.

14. The method of claim 13, wherein said first particular event name and said second particular event name are different event names.

15. A method for optimizing a publish/subscribe communication system within a network switch, wherein the network switch has at least a switch for communicating data from trunk lines through the switch to other remote trunk lines across a first communication network, and said network switch has a second underlying communication network separate from said first communication network for connecting outside of said first communication network at least a switching module in said switch to at least one of a plurality of communication modules in said network switch, said method comprising:

receiving within a communication coordinator within one of the plurality of communication modules publications made to one or more event names receiving a subscription request over the second communication network, said subscription request comprising an event expression that includes a namespace that can be correlated to a plurality of different event names, said namespace including an address of at least one component of at least one of said plurality of communication modules;

accessing within a control module connected to said plurality of communication modules a set of information pertaining to a publisher, said information comprising a particular event name to which said publisher publishes; and resolving said event expression within said control module to determine whether said particular event name constitutes a match for said event expression, thereby determining whether said subscription request is a request to receive one or more publications made to said particular event name across said second communication network;

in response to determining said subscription request is for said one or more publications made to said particular event name, sending at least one of said one or more publications to said communication coordinator;

in response to receiving said at least one publication, determining whether to execute a predetermined set of program instructions to affect a change in the communication across the network switch first communication network based on the value of said at least one publication.

16. The method of claim 15 wherein said trunk lines are optical fibers.

17. The method of claim 16 wherein said trunk lines on said first communication network are optical fibers and wherein said second communication network is an Ethernet backplane.

18. The method of claim 15 wherein said second communication network is an Ethernet backplane.

19. The method of claim 15 wherein communications across said second communication network combine to form a group selected from an intermediate communication layer and middleware.

20. The method of claim 15 further comprising the step of:
    providing each one communication module with a local table to store at least publication and subscription information relevant to said one communication module.

21. The method of claim 15 further comprising the step of:
    providing said network switch with at least a primary control module having a global table to store at least publication and subscription information relevant to each communication module connected to said second communication network.

22. The method of claim 15 further comprising the step of:
    providing said network switch with at least a primary control module having a global table to store at least publication and subscription information relevant to each communication module connected to said second communication network;
    providing said network switch with at least a secondary control module having a global table to store at least the publication and subscription information of said primary communication module to back up said primary control module; and
    providing said network switch with at least a primary control module having a global table to store at least publication and subscription information relevant to each communication.

\* \* \* \* \*